United States Patent [19]

Divoux et al.

[11] 4,434,888
[45] Mar. 6, 1984

[54] APPARATUS FOR SUPPLYING AN ARTICLE SORTING MACHINE CONVEYOR, A METHOD FOR USING THIS APPARATUS

[75] Inventors: Michel Divoux; Hubert Bonansea; Bernard Constant, all of Paris, France

[73] Assignee: Hotchkiss-Brandt Sogeme H.B.S., Paris, France

[21] Appl. No.: 285,289

[22] Filed: Jul. 20, 1981

[30] Foreign Application Priority Data

Jul. 22, 1980 [FR] France ................................ 80 16125

[51] Int. Cl.³ .............................................. B65G 37/00
[52] U.S. Cl. .................................... 198/466; 198/470; 198/489
[58] Field of Search ............... 198/465, 466, 469, 470, 198/489, 572, 575

[56] References Cited

U.S. PATENT DOCUMENTS

| | | | |
|---|---|---|---|
| 1,649,639 | 11/1927 | Wright | 198/489 |
| 1,656,909 | 1/1928 | Dewey | 198/489 |
| 3,084,779 | 4/1963 | Mladek et al. | 198/489 |
| 3,187,878 | 6/1965 | Harrison et al. | 198/469 X |
| 3,995,735 | 9/1974 | Risley . | |

FOREIGN PATENT DOCUMENTS

| | | |
|---|---|---|
| 1756031 | 4/1970 | Fed. Rep. of Germany . |
| 678711 | 9/1964 | France . |
| 1559786 | 3/1969 | France . |
| 2301458 | 2/1975 | France . |
| 1129070 | 5/1967 | United Kingdom . |

Primary Examiner—Joseph E. Valenza
Assistant Examiner—Dennis J. Williamson
Attorney, Agent, or Firm—Oblon, Fisher, Spivak, McClelland & Maier

[57] ABSTRACT

The invention relates to an apparatus for supplying a conveyor of an article sorting machine. It also relates to a method for using this apparatus. The apparatus essentially comprises a storage system (1) constituted by a plurality of belts ($t_1 \ldots t_n$) and a tilting chair-like support (2) able to occupy a raised position ($P_1$) and a lowered position $P_2$. The articles are placed on the first belt $t_1$ only when the latter is completely free of articles and when the following belt is also free. Movement of the said belt is then commenced. Movement of each of the following belts is only commenced when the belt following it is free. The final belt $t_n$ is put into movement when it carries an article and when the support (2) is free and in the raised position $P_1$. When a free rack (4) of conveyor (5) arrives at the right of the support, tilting takes place and the article then drops into rack (4).

8 Claims, 3 Drawing Figures

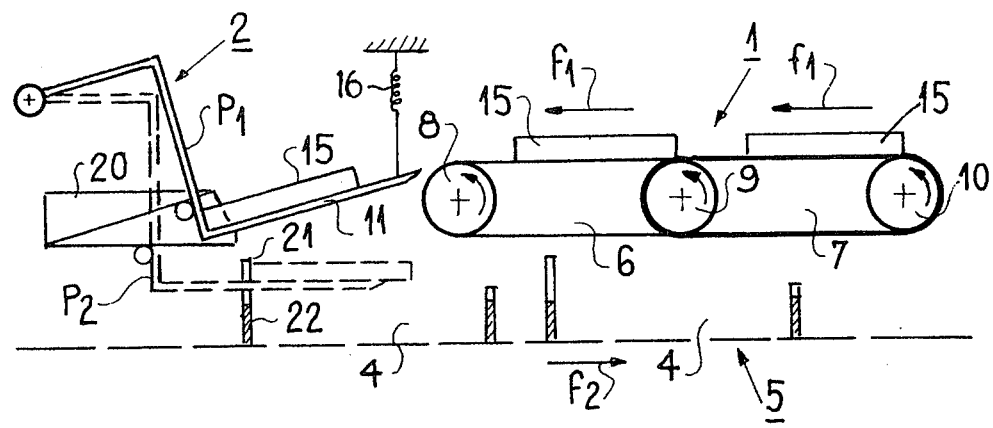
FIG_1
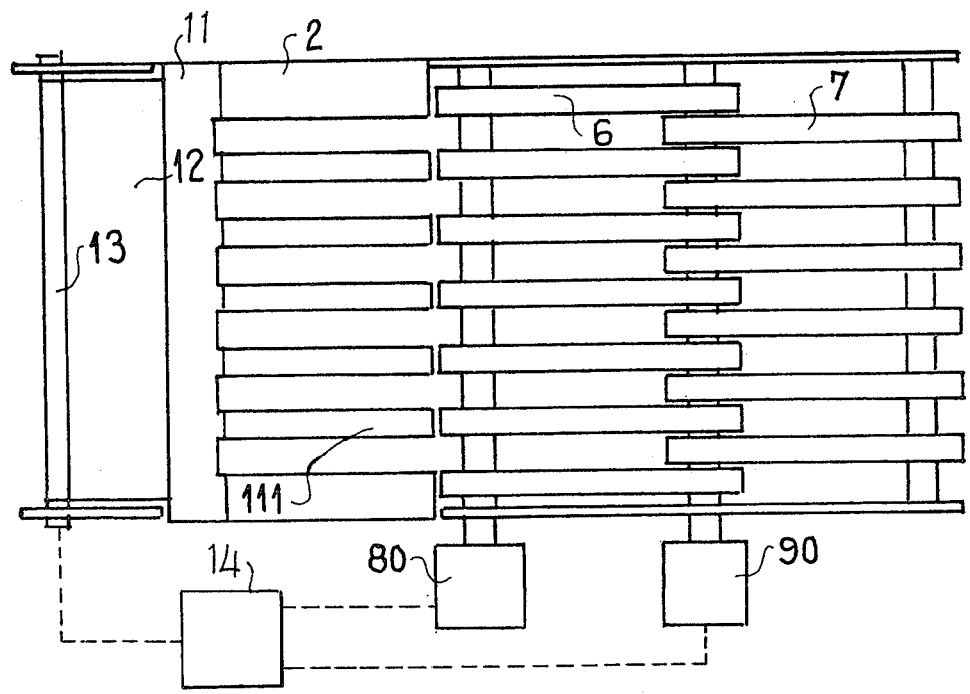
FIG_2

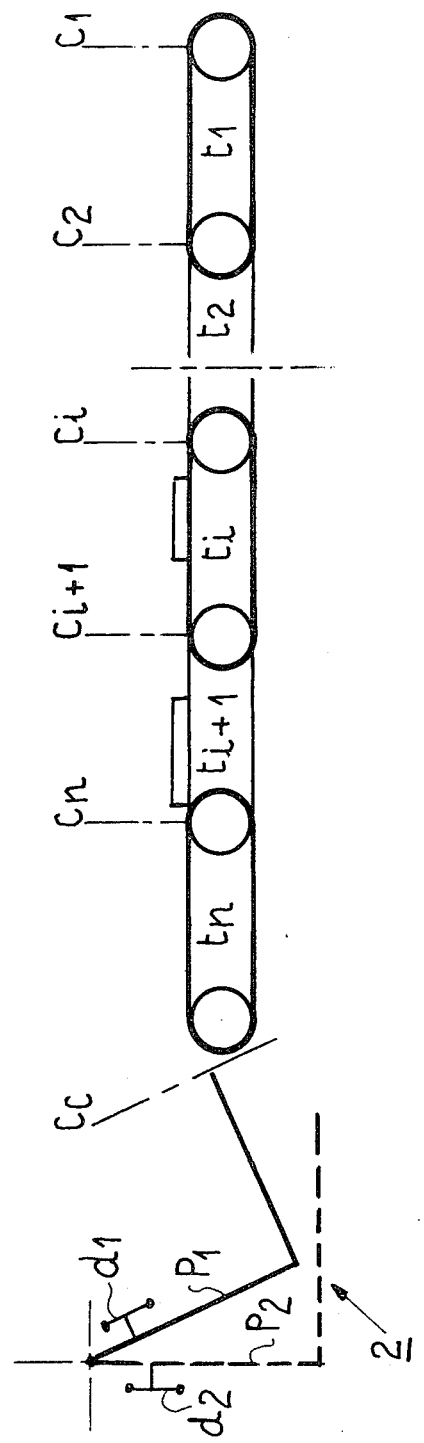

APPARATUS FOR SUPPLYING AN ARTICLE SORTING MACHINE CONVEYOR, A METHOD FOR USING THIS APPARATUS

BACKGROUND OF THE INVENTION

The invention relates to an apparatus for supplying a conveyor of an article sorting machine. It also relates to a method for using such an apparatus and to any sorting machine equipped with such an apparatus.

Article sorting machines are generally constituted by a conveyor which carries the articles to be sorted from the intake station or stations to the sorting or so-called "discharge" stations. When the articles are of a uniform nature, uniformly positioned and carry an automatically readable code, the articles can be individually gripped and presented in an automatic mechanical manner. When this is not the case, an operator must manually carry out the aforementioned operations. In both cases, it is also necessary to place the articles on the conveyor, this problem being inadequately solved in the present state of the art. Thus, either this operation is carried out automatically with a serious risk of error or it is carried out manually and the operator must devote a large part of his or her time and attention to seeking out the available locations and then to correctly placing the articles in these locations.

BRIEF SUMMARY OF THE INVENTION

The object of the present invention is therefore to obviate or ameliorate the foregoing disadvantages. It therefore relates to an apparatus permitting the semi-automatic supply of the conveyor of a sorting machine. This apparatus makes it possible for the operator to introduce the articles to be sorted at his own speed, i.e. as a function of his personal dexterity, the nature of the articles to be sorted, the quality of their arrangement, and the legibility of the code. Thus, the number of tasks which the operator has to perform is reduced by on the one hand eliminating the times required for seeking and waiting for an available location on the conveyor, whilst on the other hand contributing to the speed and accuracy of the movement. This apparatus solves the problems of speed, reliability, and ergonomy caused by the placing or introducing of articles on a conveyor of a sorting machine.

Therefore, the present invention relates to an apparatus effecting a storage between the operator and the conveyor, as well as the automatic placing of the article in a case or rack available on the conveyor. The invention more specifically relates to an apparatus for supplying the conveyor of an article sorting machine. The apparatus comprises a storage system having a plurality of endless belts ($t_1 \ldots t_n$) each of which is moved when it carries a single article and when the belt which immediately follows it, bearing in mind the travel direction $f_1$ of the belt, carries no article, a tilting chair-like support located in the extension of the storage system, which is able on the one hand to occupy a raised position $P_1$ when it is empty and to receive in this configuration an article coming from the final belt contiguous with the support and on the other hand is able to occupy a lowered position $P_2$ after having undergone a tilting movement after which the article carried by the support drops into an empty case or rack of the conveyor appearing to the right of the support synchronously with the tilting movement. The components cooperate with one another particularly as a result of information supplied by a set of position detectors ($C_1 \ldots C_n$, $d_1 d_2$), the information being utilized by a control device.

BRIEF DESCRIPTION OF THE DRAWINGS

The invention is described in greater detail hereinafter relative to non-limitative embodiments shown in the attached drawings.

FIG. 1 is a diagrammatic view of an apparatus according to the invention viewed from the side.

FIG. 2 is a diagrammatic plan view of part of the apparatus of FIG. 1.

FIG. 3 is an explanatory diagram illustrating the coordination of the movements of the essential components constituting the invention by means of a certain number of correctly arranged detectors.

DETAILED DESCRIPTION OF THE PREFERRED EMBODIMENTS

As is apparent from FIGS. 1 and 2, the apparatus according to the invention essentially comprises two components, namely a storage system 1 and a tilting chair-like support 2. These two components cooperate with one another for ensuring the storage and then the automatic despositing or introduction of articles into the empty racks such as 4 of a conveyor 5 which conveys said articles from an intake station to a discharge station. The storage system 1 is constituted by a plurality of endless belts, whereof only two 6, 7 are shown in the drawings. The belts 6, 7 are displaced by pulleys 8, 9, 10, etc (the direction of travel being given by the arrow $f_1$), whilst the pulleys 8, 9, 10 are driven by motors 80 and 90. The belts 6, 7 are preferably fitted into one another as shown in FIG. 2 to ensure a better travel path, i.e. a better transfer of the articles.

The tilting support 2 ensures the transfer of the articles onto the conveyor 5 and is constituted by a notched plate 11 (the teeth of the notched plate 11 being given the reference numeral 111 in FIG. 2). Plate 11 is fixed to a frame 12 which pivots about a horizontal shaft 13 positioned above conveyor 5 and perpendicular to the conveying direction $f_2$. Support 2 can occupy two positions, namely a so-called raised position $P_1$ and a so-called lowered position $P_2$. It occupies position $P_1$ for receiving an article 15 fed to it by the final belt of storage system 1. After tilting, the support is located in position $P_2$, and the article 15 carried by it falls into a free rack 4 of conveyor 5. When article 15 has dropped onto rack 4, the support 2 automatically reassumes its raised position $P_1$ and a new cycle can start.

The tilting of support 2 is controlled by a control device 14 which previously has allocated to the article 15 on support 2 an available rack 4. The latter arrives at the right of support 2 synchronized with the tilting movement, which is effected by the action of a cam 20 which moves with rack 4. This type of control ensures a perfect reproducibility of the relative movements between the support and the rack. The design of cam 20 ensures both the bringing to the desired speed of the article 15 carried by the support 2 and the most favourable movement for transfer of the article 15 between the support 2 and the rack 4. The positive discharge of the support 2 takes place by an engagement of the notched plate 11 carrying the article 15 by fingers such as 21 moving synchronously with the movement of rack 4. According to one embodiment, fingers 21 are rendered integral with the rear wall 22 of rack 4 (bearing in mind the direction of movement of the conveyor given by arrow $f_2$). Whilst interfitting with the teeth 111 of plate 11, fingers 21 displace article 15, which drops into rack 4 when it has been disengaged from the plate 11 of the chair-like support. Support 2 can be brought into its raised position $P_1$ by any appropriate means, e.g. spring 16.

FIG. 3 is an explanatory diagram illustrating the coordination of the movements of the essential components constituting the invention by means of a set of position detectors arranged in a particular way. The storage system 1 is constituted by a plurality of endless belts $t_1, t_2 \ldots t_i, t_{i+1} \ldots t_n$.

Successive sequences must be examined. The first sequence corresponds to the starting up of the first belt $t_1$ on which the operator places an article. The second corresponds to the starting up of a particular belt positioned between the first belt $t_1$ and the last belt $t_n$ (in the drawing it is a question of belts $t_2 \ldots t_i$ and $t_{i+1}$). Another sequence corresponds to the starting up of the final belt $t_n$ cooperating with the tilting support 2. Detectors are provided along the path of the articles for supplying information to the control device 14 making it possible to determine the presence or absence of an article at support 2 and each of the belts of storage system 1. The detectors are $C_1, C_2 \ldots C_i, C_{i+1}, C_n$. A detector $C_c$ detects the passage of an article from belt $t_n$ to support 2. Finally, two position detectors $d_1$ and $d_2$ make it possible to respectively detect the raised position $P_1$ or lowered position $P_2$ of support 2.

The apparatus according to the invention functions in the following way. During the first stage, an operator places the article to be conveyed on the first belt $t_1$. If detector $C_1$ detects the absence of an article on belt $t_2$, belt $t_1$ is started up and moves the article towards the following belt. In the opposite case (that is if belt $t_1$ is not vacant), the system is blocked, a pilot light lights up and the operator must wait for the article on the belt $t_1$ to be removed from belt $t_1$ and for the latter to be brought into the vacant state before placing a further article on it.

The second sequence corresponds to the progressive advance of each article from a belt of a given row to the belt of the following row. For example, for the starting up of the belt of row $t_i$, so that it can displace the article which it carries, the following belt $t_{i+1}$ must not be carrying an article. The control device 14 can determine whether belt $t_{i+1}$ is free by examining the information supplied by the upstream and downstream detectors. Thus, any risk of the simultaneous presence of two articles on a belt of a given row is obviated.

Finally, when the article reaches the belt preceding the final belt $t_n$, the process of the third sequence is started. Different conditions must be fulfilled for the movement of belt $t_n$. Support 2 must be in the raised position $P_1$, this information being supplied by position detector $d_1$. In addition, the support 2 must not be carrying any article. The absence of any article is established as a result of a control enquiry relating to all the actions previously undergone by the support. Finally, belt $t_n$ must carry an article, which can be detected by means of detector $C_n$. As stated hereinbefore, the tilting of the support into its lowered position $P_2$ detected by detector $d_2$ takes place as soon as there is an available conveyor rack to the right of said support. The integral fingers 21 of the rack 4 then engage with the chair-like support plate 11 and remove from the latter the article which it is carrying.

An apparatus according to the invention can cooperate with any conveyor having racks with a rear wall in the form of a comb. It can also cooperate with a conveyor able to bring about a movement which is synchronous with its displacement of a comb-like member used for discharging articles from the support onto the conveyor.

The present invention is applicable to any sorting installation, particularly including the sorting of large photographic packs, e.g. magazines.

What is claimed is:

1. Apparatus for supplying articles to a conveyor, said apparatus comprising:
   (a) a storage system comprising a plurality of endless belts in series, all but the last in the series being arranged to feed articles thereon to the next endless belt in the series;
   (b) first means for independently driving each of said endless belts;
   (c) a tilting support in the form of a notched plate having a plurality of teeth located at the downstream end of said series of endless belts, said tilting support being variable between a raised position in which it is in position to receive an article from the last in the series of endless belts and a lowered position in which it is in position to transfer an article to the conveyor;
   (d) second means for moving said tilting support from its raised position to its lowered position;
   (e) third means for detecting whether an article is carried by each of said endless belts;
   (f) fourth means for detecting whether said tilting support is in its raised or lowered position; and
   (g) a control device for actuating said first means associated with each of said endless belts prior to the last in the series when said third means associated with the next endless belt in the series detects that the next endless belt in the series is vacant, for actuating said first means associated with the last in the series of said endless belts when said third means associated with the preceding endless belt detects that said preceding endless belt is carrying an article and said fourth means detects that said tilting support is in its raised position, and for actuating said second means after an article has been desposited on said tilting support by the last in the series of said endless belts.

2. Apparatus as recited in claim 1 and further comprising fifth means for biasing said tilting support towards its raised position.

3. Apparatus as recited in claim 1 wherein:
   (a) a plurality of series of endless belts are provided in parallel to form a plurality of parallel rows of endless belts in which one endless belt from each series is located in parallel to, is spaced from, and is actuated with an adjacent and co-extensive endless belt from the adjacent series and
   (b) successive parallel rows of endless belts are fitted into one another to ensure a better travel path.

4. Apparatus as recited in claim 1 and further comprising teeth carried by the conveyor which interfit with the teeth in said notched plate to push articles off said tilting support when it is in its lowered position.

5. Apparatus as recited in claim 4 wherein:
   (a) the conveyor is composed of a series of racks and
   (b) said teeth carried by the conveyor are carried by the rear walls of said racks.

6. Apparatus as recited in claim 4 wherein said tilting support is at least approximately horizontal when in its lowered position.

7. Apparatus as recited in claim 1 and further comprising sixth means for actuating said second means so as to deposit articles on the conveyor at uniformly spaced intervals.

8. Apparatus as recited in claim 6 wherein said sixth means comprises a cam and a follower, one of which is carried by said tilting support and one of which is carried by the conveyor.

* * * * *